Patented Mar. 3, 1936

2,033,102

UNITED STATES PATENT OFFICE 2,033,102

SOLDERING COMPOUND AND METHOD OF MAKING THE SAME

Arthur S. Berry, Jersey City, N. J., assignor to Berry Solder Co. Inc., New York, N. Y., a corporation of New York No Drawing. Application July 7, 1932, Serial No. 621,307

3 Claims. (Cl. 148—24)

This invention relates to improvements in soldering materials and methods for producing the same, and has more particular relation to the combination of finely divided solder and a finely divided or pulverized flux.

The object of the invention is to provide a soldering material composed of very finely divided solder combined with a very finely divided flux so that the whole may be associated in a homogeneous mass, thoroughly intermingled, whereby the proper amount of flux is always present in juxtaposition to the necessary amount of solder.

A further object of the invention is to combine a finely divided solder with a finely divided flux by exerting great pressure upon both the solder and flux after they are mixed and causing them to thoroughly intermingle and become a homogeneous mass having body and rigidity and which may be made into sticks, cakes or the like for handling.

The invention further consists of the method employed for producing my improved solder and flux.

The invention also has other objects, all of which will be hereinafter set forth and claimed.

Described in general terms, the invention especially consists in so finely dividing metallic solder and a suitable flux that they will, by the application of pressure, form a homogeneous, rigid mass that may be formed into sticks or the like and used in this form to apply it to the work to be done. The extreme pressure employed in combining the solder and the flux in a dry state so intermingles and interlocks the grains of the solder and the flux that they practically become a solid mass and any chance of the subsequent shifting of solder or flux that might disturb the proper ratio of solder and flux in any given area, is thus obviated.

In making up my improved mixture, I prefer to employ zinc ammonium chloride. This zinc ammonium chloride is first reduced to a very fine powder and then mixed with the powdered tin or tin and lead powder and powdered metallic zinc in the following proportions:

|  | Per cent |
|---|---|
| Zinc ammonium chloride | 60 |
| Solder powder (40% tin, 60% lead) | 37 |
| Powdered zinc | 3 |

As an alternative mixture, I contemplate employing the following:

|  | Per cent |
|---|---|
| Granular zinc chloride | 30 |
| Granular ammonium chloride | 27 |
| Metallic tin powder | 40 |
| Powdered metallic zinc | 3 |

When the chlorides are mixed with the metal powders, and these parts come into intimate contact, a chemical change is brought about which prevents the zinc chloride from absorbing moisture and thus enables the finished powder to be always maintained in a dry state which is necessary to its proper use.

It has been found that zinc chloride ordinarily absorbs moisture very rapidly and the addition of metallic zinc to soldering materials has for this reason been avoided as the absorption of moisture causes the deterioration of the soldering material. I have found, however, that by the addition of a very small percentage of zinc, the solder does not seem to be unduly affected and will not become sluggish as it ordinarily would. This zinc in anywhere from 3% to 10% quantities does not seem to affect the flowing of the solder, and by its presence affects the forming of a metal surface on aluminum that will cause the latter to take the ordinary solder without the use of any additional flux. This is particularly desirable as it is well known how difficult it is to properly solder aluminum.

The material produced as above may be used in powdered or granular form as a solder and flux combined, but by preference I combine this powdered solder and flux into sticks or cakes by high pressure. When so pressed the finely divided particles of solder (tin and lead) and the finely divided particles of zinc ammonium chloride and the finely divided powdered metallic zinc are all forced into interlocking relation to form a homogeneous mass which indefinitely retains its rigid condition and retains the several constituents in their proper mixed relation with each other. This thorough mixing of the powdered ingredients brings just the proper amount of flux into juxtaposition with the proper amount of solder and these ratios of quantities are thus maintained by the pressing operations.

The bars or cakes are pressed into moulds under about five tons pressure although I do not care to limit myself to any definite pressure as any pressure would be sufficient that would thoroughly lock the dry powders of the different ingredients together.

Attention is especially called to the fact that all of the ingredients that go to make up this solder and flux are combined in a finely divided condition and in their dry state and no artificial binder of any character is employed. This condition, of course, allows for a clean solder job without any stains or spots caused by the usual binders used in combining solders and fluxes.

The invention is particularly useful when my improved solder and flux is made up into stick form as in this form it is quite readily applied to the work and just the right amount of solder and flux are applied at any given point on the metal to be soldered.

It will be further understood that by the peculiar method of combining the ingredients of this invention that all moisture or liquid is absent from the combined mixture and the same is prevented from absorbing moisture after it is made and thus deterioration of the solder and the flux is prevented. Such deterioration is always present in combined solders and fluxes when any moisture is present such as might be contained in a binder for the elements or because of absorption of moisture after being manufactured.

Having thus described my invention, what I claim as new and desire to secure by Letters Patent is:

1. A soldering stick or cake comprising finely powdered, dry zinc ammonium chloride and finely powdered, dry tin and lead formed, free from the action of an artificial binder, into a dry homogeneous interlocking structure by high pressure.

2. A soldering stick or cake comprising finely powdered, dry zinc ammonium chloride, finely powdered, dry tin and lead and finely powdered metallic zinc formed, free from the action of an artificial binder, into a dry homogeneous interlocking structure by high pressure.

3. The method of producing a soldering stick or cake, which comprises thoroughly combining powdered zinc ammonium chloride, powdered, dry tin and lead, and powdered, dry metallic zinc in a loose dry state, and then subjecting this mixture to high pressure to form a thoroughly homogeneous and interlocking stick or cake which may be handled for soldering purposes, the combination of the aforesaid materials being effected by high pressure free from the action of an artificial binder.

ARTHUR S. BERRY.